Patented Oct. 4, 1927.

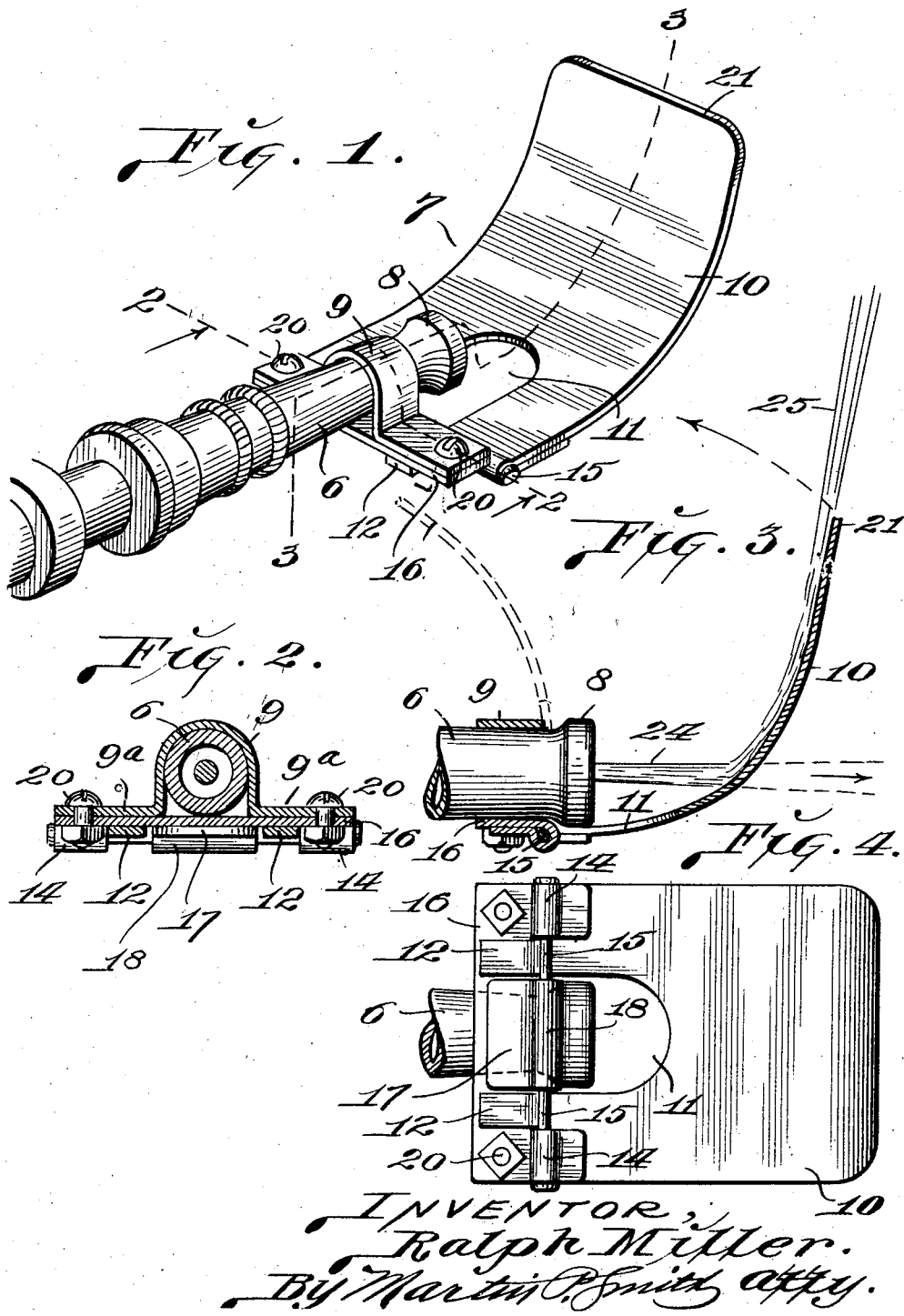

1,644,072

UNITED STATES PATENT OFFICE.

RALPH MILLER, OF LOS ANGELES, CALIFORNIA, ASSIGNOR TO HAROLD H. GUNNELL.

SPRAY ATTACHMENT FOR HOSE NOZZLES.

Application filed August 13, 1925. Serial No. 50,014.

The present invention relates to hose nozzles, lawn sprinklers and the like, and has for its principal object, the provision of a device adapted to serve for the common purposes for which an ordinary hose nozzle is employed, as well as serving for a lawn sprinkler and the like.

Another object of the invention is to provide an article of manufacture adapted for attachment to a common hose nozzle; to quickly convert such nozzle into a portable lawn spray.

Another object of the invention is to provide an attachment for hose nozzles, capable of directing all of the water upwardly and forwardly, it being understood that a common hose nozzle, regardless of how it is adjusted or positioned, is not well adapted for distributing water over a lawn when it is set in some fixed position.

Another object of the invention is to provide an attachment for improvment in hose nozzles, which attachment embodies a member movable from operative position, and vice versa, almost instantly and without turning off the water.

Another object of the invention is to provide an attachment for the above purposes, which may be quickly attached by unskilled persons, to a common hose nozzle.

Other objects and advantages of my invention will appear hereinafter.

I have illustrated my invention by the accompanying drawings in which:

Fig. 1 is a perspective of a complete embodiment of my invention.

Fig. 2 is a section thereof seen on a line 2—2 of Fig. 1.

Fig. 3 is a section thereof seen on a line 3—3 of Fig. 1.

Fig. 4 is a view in bottom elevation of the forward end of the embodiment shown in Fig. 1.

The said embodiment of my invention includes a common hose nozzle 6 and an attachment generally indicated by the numeral 7. The attachment may be secured to the nozzle by various means, and in the present embodiment, advantage is taken of the usual annular enlargement 8, usually provided at the outer end of the nozzle. A yoke or strap 9 is provided with arches over the nozzle just to the rear of the annular enlargement 8, and which terminates at each end in respective horizontal extensions 9ª.

The attachment includes a curved deflecting plate 10 which is provided at its inner end with an elongated aperture 11 intersecting that end and bifurcating same to provide spaced stop fingers 12. Adjacent the stop fingers, on each side of the plate, the metal is involuted, as at 14 to firmly engage a transverse hinge pin 15.

A base member 16 is hingedly connected with the plate by means of an integral tongue 17 which extends into the aperture in the plate and which is involuted as at 18 to encircle the hinge pin. Thus, the plate 10 is hingedly connected to the base member while the assembly of base member and deflecting plate is held to the nozzle by bolting the extensions of the yoke to said member. Ordinary short stove bolts, such as 20 may be employed so that any unskilled person may secure the attachment to a common hose nozzle.

When the attachment is so secured, the deflecting plate extends substantially horizontally forward of and below the nozzle, a suitable distance. Then the curvature carries the metal of the plate upwardly and forwardly until the extreme outer end 21 is almost vertically disposed.

The elongated aperture is disposed below the outer end of the nozzle and continues forwardly thereof a suitable distance. The stop fingers abut the undersurface of the base member and thereby prevent the deflecting plate from being turned below the plane of the base member. The deflecting plate, however, is free to be turned back into inoperative position, as indicated by the broken lines in Fig. 3. The aperture in the plate is then in inoperative position and the nozzle projects through the aperture.

As to the operation of the complete embodiment, the nozzle is adapted to discharge the usual concentrated steam or jet 24.

When the deflecting plate is disposed in the operative position, as shown particularly in Fig. 3, the jet strikes the plate at a point suitably forward of the nozzle. The impact of the jet causes the fluid to be spread out very appreciably, and the continual thrust against the plates holds the stop fingers in abutment with the base member. The result of the impact on the plate, and the deflection of the stream by the plate, is an excellent fan-like jet or spray indicated at 25. Such jet moves upwardly and also forwardly, as it leaves the plate, and is well adapted for evenly distributing the water over a large area. With the parts in the operative position upon the ground, the broad and flattened nature of the attachment being such that said attachment will stay contiguous with any surface on which it is placed.

If at any time, it is desired to use the nozzle alone, the deflecting plate may be thrown into inoperative position, even without the necessity of turning off the flow of water.

Likewise, the plate may be moved from inoperative position to operative position, instantly and without effort.

It will be apparent now that I have provided a simple, easily applied and readily operated attachment which will convert any common hose nozzle into a combination nozzle and self-establishing lawn spray, and while I have shown and described a specific embodiment of my invention, I do not limit myself to any specific construction or arrangement of parts, and may alter same as I desire, without enlarging the scope of my invention within the appended claim.

I claim as my invention:

A spray attachment for hose nozzles comprising a pair of plates, means for securing said plates to each other and clamping the same on a hose nozzle, a curved plate hinged to the lower one of said plates and capable of being swung so as to occupy a spraying or non-spraying position, said plate being provided adjacent to its hinged end with an opening for the accommodation of the end of the nozzle to which the device is applied and the jet of water issuing from said nozzle when said plate occupies its non-spraying position and a stop finger projecting from the hinged end of the curved plate and adapted to bear against the side of the lower one of the clamping plates to hold said curved plate in spraying position.

In testimony whereof I affix my signature.

RALPH MILLER.